United States Patent [19]

Schlatter

[11] 3,926,035

[45] Dec. 16, 1975

[54] GRAVITOMETER

[75] Inventor: Gerald Lance Schlatter, Boulder, Colo.

[73] Assignee: International Telephone & Telegraph Corporation, New York, N.Y.

[22] Filed: Nov. 29, 1974

[21] Appl. No.: 528,022

[52] U.S. Cl. .............................................. 73/32 A

[51] Int. Cl.² ........................................ G01N 9/00

[58] Field of Search .............. 73/32 A, 517 AV, 504

[56] References Cited

UNITED STATES PATENTS

| | | | |
|---|---|---|---|
| 3,377,840 | 4/1968 | Cole | 73/32 A |
| 3,677,067 | 7/1972 | Miller et al. | 73/32 A |
| 3,729,982 | 5/1973 | Senda | 73/32 A |

*Primary Examiner*—James J. Gill

*Attorney, Agent, or Firm*—A. Donald Stolzy

[57] ABSTRACT

A gravitometer incorporating two ferromagnetic cantilevered vanes simultaneously vibrated by a spaced ferromagnetic driver at their respective same or different frequencies. The driver provides a field reversal which produces a double frequency at two respective piezoelectric crystal pickups fixed to the respective vanes. Two respective divide-by-two dividers cause the driver to produce a synchronous field drive so that the apparatus forms two combined closed loop electromechanical oscillators, the loops having amplifiers with respective gains adequate to sustain vibrations of both vanes continuously.

5 Claims, 17 Drawing Figures

GRAVITOMETER

BACKGROUND OF THE INVENTION

This invention relates to instruments useful in systems or by themselves, and more particularly to gas or fluid gravitometers.

The particular field of the present invention is quite new and the only background prior art even close to the present invention and known to applicant is disclosed in application Ser. No. 270,335 filed July 10, 1972, by G. L. Schlatter for DENSITOMETER, now U.S. Pat. No. 3,862,568 issued Jan. 28, 1975 and copending application Ser. No. 265,327 filed June 22, 1972, by G. L. Schlatter and C. E. Miller for METHOD OF AND APPARATUS FOR PRODUCING FLUID GRAVITY AND DENSITY ANALOGS AND FLOWMETERS INCORPORATING GRAVITOMETERS. The assignee of the instant application is the assignee of both of said copending applications Ser. Nos. 270,335 and 265,327.

In said application Ser. No. 265,327, a D.C. bias is employed for a twin ferromagnetic vane drive used in the gravitometer. This D.C. bias is used to suppress a double frequency piezoelectric crystal pickup output. In some cases elimination of the said D.C. bias can become desirable.

SUMMARY OF THE INVENTION

In accordance with the device of the present invention, the said D.C. bias is partially or totally eliminated and, yet, the double frequency signals present no resonance disadvantage. This is accomplished by the use of two divide-by-two dividers.

The above-described and other advantages of the present invention will be better understood from the following detailed description when considered in connection with the accompanying drawings.

BRIEF DESCRIPTION OF THE DRAWINGS

In the drawings which are to be regarded as merely illustrative.

DESCRIPTION OF THE PREFERRED EMBODIMENTS

THE FLOWMETER OF FIG. 1

Figures 1, 2:
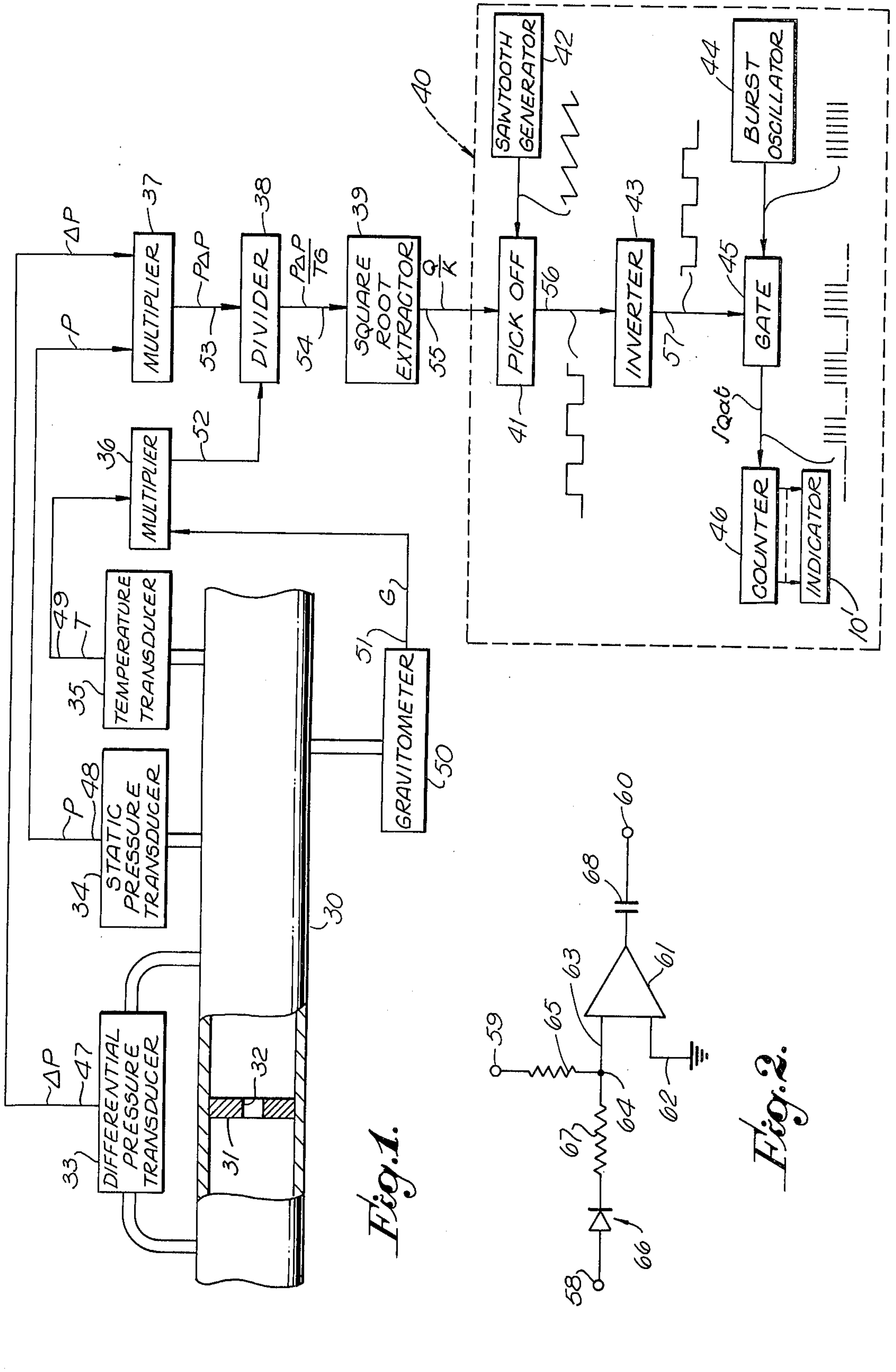
FIG. 1 is a diagrammatic view of a flowmeter.
FIG. 2 is a schematic diagram of a pickup shown in FIG. 1.

It is well known in the prior art that the total flow $\int Q\,dt$ where $t$ is time and Q is the volume rate of gas flow per unit time, Q being measured in standard cubic feet. This standard cubic feet (at, for example, 14.7 pounds/cubic feet pressure and 68° F.) of a gas in a pipeline may be calculated from the following equation (1) defining mass flow rate Q.

$$Q = K\sqrt{\frac{P\Delta P}{TG}} \qquad (1)$$

where,

P is the static pressure in a pipeline 30 shown in FIG. 1,

ΔP is the differential pressure across an orifice 32,

T is the absolute temperature of the gas, and

G is the "gravity" of the gas.

The gravity, G, of a gas is defined by $$G = \frac{\rho_g}{\rho_a} \qquad (2)$$

where, $\rho_g$ is the density of the gas at a predetermined temperature and at a predetermined pressure, and $\rho_a$ is the density of air at the same said predetermined temperature and predetermined pressure.

It is interesting to note that G is substantially "independent" of temperature and pressure. That is, for the same gas, the value of G will be the same regardless of which "predetermined temperature" and "predetermined pressure" it is measured. The proof for this characteristic follows.

Boyle's law and Charles law may be combined into the single expression $$PV/T \qquad (3)$$

which is equal to a constant. Hence, $$PV = MRT \qquad (4)$$

where,

P is pressure,

V is volume,

M is mass,

R is the gas constant, and

T is absolute temperature.

If $\rho$ is density, then $$\rho = \frac{M}{V} \qquad (5)$$

Thus, combining (4) and (5), $$\rho = \frac{K_1 P}{T} \qquad (6)$$

where, $$K_1 = \frac{1}{R} \qquad (7)$$

Equations (8) and (9) are analogous to (6) for a gas, g, of interest and air, a.

$$\rho_g = \frac{K_{1g}P_g}{T_g} \qquad (8)$$

$$\rho_a = \frac{K_{1a}P_a}{T_a} \qquad (9)$$

Dividing (8) by (9) and assuming $P_g = P_a$ and $T_g = T_a$, $$\frac{\rho_g}{\rho_a} = \frac{K_{1g}}{K_{1a}} \qquad (10)$$

Combining (2), (6) and (10), $$G = \frac{R_a}{R_g} \qquad (11)$$

Equation (11) thus indicates that G is truly independent of which set of temperature and pressure conditions are selected.

Equation (1) may be proven as follows. The flow, $Q_s$, through an orifice is $$Q_s = K_2A\sqrt{2gH_g} \qquad (12)$$

where, $K_2$ is a constant,

A is the orifice area, g is acceleration due to the earth's gravity, and $H_g$ is the differential pressure head in feet across the orifice.

To convert the differential head to inches of air $$H_g = \frac{H_a\,\rho_a}{12\rho_g} \qquad (13)$$

Hereinafter, the 68° F. and the 14.7 pounds/square inch will be referred to as "standard temperature and pressure $T_a$ and $P_a$, respectively."

Equation (8) can thus be divided by equation (9) as follows $$\rho = \frac{K_{1a}GP}{T} \qquad (14)$$

where,

P is equal to $P_g$,

T is equal to $T_g$, and $\rho$ is equal to $\rho_g$.

Substituting $\rho = \rho_g$ into (13), (14) into the resultant, one obtains $$H_g = \frac{H_a\,\rho_aT}{12K_{1a}GP} \qquad (15)$$

Substituting (15) into (12) one obtains $$Q_s = K_2A\sqrt{\frac{2gH_a\,\rho_aT}{12K_{1a}GP}} \qquad (16)$$

Thus, $$Q_s = K_3\sqrt{\frac{H_a\rho_aT}{GP}} \qquad (17)$$

where, $$K_3 = K_2A\sqrt{\frac{2g}{12K_{1a}}} \qquad (18)$$

From expression (3)

$$\frac{PQ}{T} = \frac{P_aQ_a}{T_a} \qquad (19)$$

Thus, $$Q_a = \frac{PQT_a}{TP_a} \qquad (20)$$

Combining (17) and (20)

$$Q = K_3\sqrt{\frac{H_a\,\rho_aT}{GP}} \times \frac{PT_a}{TP_a} \qquad (21)$$

and $$Q = K\sqrt{\frac{P\Delta P}{TG}} \qquad (22)$$

where, $$K = \frac{K_3T_a}{P_a} \qquad (23)$$

and $\Delta P$ is equal to $H_a\rho_a$ (pressure equals height times density).

The embodiment of FIG. 1 mechanizes equation (1) for continuously indicating total volume flow in standard cubic feet.

In FIG. 1, a portion of a pipeline is indicated at 30 having a disc 31 fixed therein to provide an orifice 32. A differential pressure transducer 33 senses the difference between the pressures on opposite sides of orifice 32. A static pressure transducer 34 senses the pressure on one side of orifice 32. A temperature transducer 35 senses the temperature on one side of the orifice 32.

In FIG. 1, a multiplier 36, a multiplier 37, a divider 38 and a square root extractor 39 are provided. An output circuit 40 is connected from the output of square root extractor 39. Output circuit 40 includes a pickoff 41, a saw-tooth generator 42, an inverter 43, a burst oscillator 44, a gate 45 and a counter 46.

Differential pressure transducer 33 produces a D.C. current on an output lead 47 which is directly proportional to the difference between the pressures on opposite sides of the orifice 32.

Static pressure transducer 34 produces a D.C. current on an output lead 48 directly proportional to the pressure on one side of orifice 32. Temperature transducer 35 produces a D.C. current on an output lead 49 directly proportional to the temperature of the gas inside pipeline portion 30 on one side of orifice 32.

A gravitometer 50 is connected from pipeline portion 30 on one side of orifice 32 to produce a D.C. output current on an output lead 51 directly proportional to the gravity of the gas in pipeline portion 30.

Multiplier 36 is connected from leads 49 and 51. The output of multiplier 36 is impressed upon an output lead 52 which is connected to divider 38. Multiplier 36 then produces an output current in lead 52 which is directly proportional to the product of the output currents of temperature transducer 35 and gravitometer 50.

Multiplier 37 is connected from both of the pressure transducers 33 and 34 to divider 38. Multiplier 37 has an output lead 53, the current in which is directly proportional to the product of the current outputs of the pressure transducers 33 and 34. Divider 38 has an output lead 54 which carries a D.C. voltage directly proportional to the output of multiplier 37 divided by the output of multiplier 36. Divider 38 may, if desired, include a current-to-voltage converter at its output. A current-to-voltage converter, for example, may be simply a resistor connected from the output of divider 38 to ground.

Notwithstanding the foregoing, any component part of the invention employed to produce a current analog may be employed to produce a voltage analog.

Square root extractor 39 has an output lead 55 upon which a D.C. voltage is impressed which is directly proportional to the square root of the output of divider 38.

Pickoff 41 has an output lead 56 upon which a square wave is impressed. This square wave is generated by comparing the amplitude of the saw-tooth output of generator 42 with the amplitude of the D.C. voltage on lead 55.

Inverter 43 is connected over an output lead 57 to gate 45. Inverter 43 inverts the square wave output of pickoff 41.

It is to be noted that the dimensions of a square wave are conventionally vertical in volts and horizontal in time. The word "square" thus has no reference to any particular relationship between the amplitude and period of such a wave. The phrase "square wave" is, therefore, hereby defined for use herein and in the claims to mean "a rectangular wave" or vice versa.

Burst oscillator 44 produces output pulses at a constant rate and at a pulse repetition frequency (PRF) which is large in comparison to the PRF of the square wave appearing on inverter output lead 57. Gate 45 is opened during the positive pulses of the square wave on lead 57, and passes pulses from the burst oscillator 44 to counter 46 during the pulses of the square wave on lead 57.

All of the parts shown in FIG. 1 may be entirely conventional, if desired; however, the combination thereof is new. Alternatively, the gravitometer 50 may be constructed in accordance with the present invention as will be explained.

Multipliers 36 and 37 may be entirely conventional voltage or current multipliers, if desired. Divider 38 may be an entirely conventional divider, if desired. Square root extractor 39 may be an entirely conventional square root extractor or function generator, if desired.

Saw-tooth generator 42, gate 45, inverter 43 and counter 46 may all be entirely conventional. Pickoff 41 may also be entirely conventional, if desired.

If desired, an indicator 10′ connected from counter 46 may be calibrated in total volume flow in standard cubic feet. Counter 46, if desired, may be an entirely conventional binary counter.

In FIG. 2, pickoff 41 is shown including input terminals 58 and 59, and an output terminal 60. An amplifier 61 is also shown in FIG. 2 connected to ground at 62 and having an input lead 63 connected to a summing junction 64. A resistor 65 is connected from terminal 59 to junction 64. A diode 66 and a resistor 67 are connected in series in that order from terminal 58 to junction 64. A capacitor 68 is connected from the output of amplifier 61 to terminal 60.

In FIG. 1, terminal 58 would be connected from saw-tooth generator 42. Terminal 59 would be connected from square root extractor 39. Output terminal 60 would be connected to inverter 43. The voltage supplied to terminal 59 by square root extractor 39 would be a negative voltage. The output signal of saw-tooth generator 42 would be a positive going voltage. It would begin at ground and increase from there to its peak value. When the potential at terminal 58 equals or slightly exceeds the negative potential at 59, amplifier 61, if it is a high gain amplifier having a gain of several hundred thousand, will produce a square wave output by being driven into saturation. The pulses at the output of amplifier 61 will then have a pulse width directly proportional to the output voltage of square root extractor 39.

Figure 3:
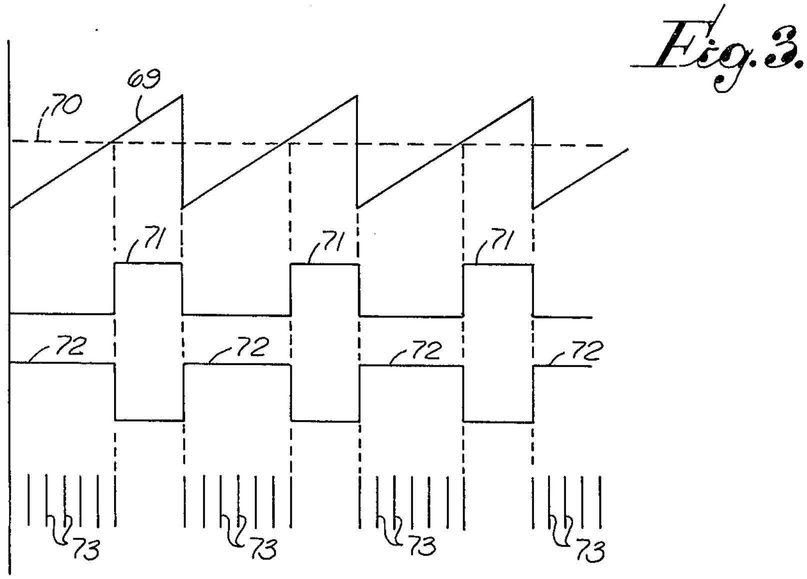
FIG. 3 is a graph of a group of waveforms characteristic of the operation of the invention shown in FIG. 1.

The saw-tooth output voltage of saw-tooth generator 42 is indicated at 69 in FIG. 3. The corresponding positive magnitude of the negative output voltage of square root extractor 39 is indicated at the horizontal line 70 in FIG. 3. The horizontal level of line 70 may vary from time to time, but will generally not vary as fast as the PRF of the saw-tooth voltage.

As shown in FIG. 3, pulses 71 are produced at the output of pickoff 41 in FIG. 1 which have a time width determined by the end of each sawtooth 69 and at the beginning which occurs where the inclined portion of each saw-tooth crosses line 70.

As shown in FIG. 3, inverter 43 has output pulses 72, the time width of which is directly proportional to the amplitude of the output signal of square root extractor 39. In FIG. 3, the portion of the output pulses of burst oscillator 44, which are counted by counter 46, are indicated at 73.

OPERATION OF THE EMBODIMENT OF FIG. 1

In FIG. 1, the transducers 33, 34 and 35 produce differential pressure, static pressure and temperature analogs. The pressure analogs are multiplied together by multiplier 37. The temperature analog is multiplied by the gravity analog appearing on the output lead 51 of gravitometer 50 by multiplier 36. The output of multiplier 37 is divided by the output of multiplier 36 in divider 38. The square root of the output of divider 38 is taken by square root extractor 39. The analog output of square root extractor 39 is then integrated in output circuit 40. Saw-tooth generator 42, pickoff 41 and inverter 43 produce a time analog at the output of inverter 43 of the output of square root extractor 39. This is converted to a digital number which is accumulated in binary counter 46, this digital number representing total volume flow in standard cubic feet. This digital number is indicated in indicator 10' which has one lamp for each flip-flop or stage in counter 46.

THE ALTERNATIVE FLOWMETER OF FIG. 4

Figure 4:
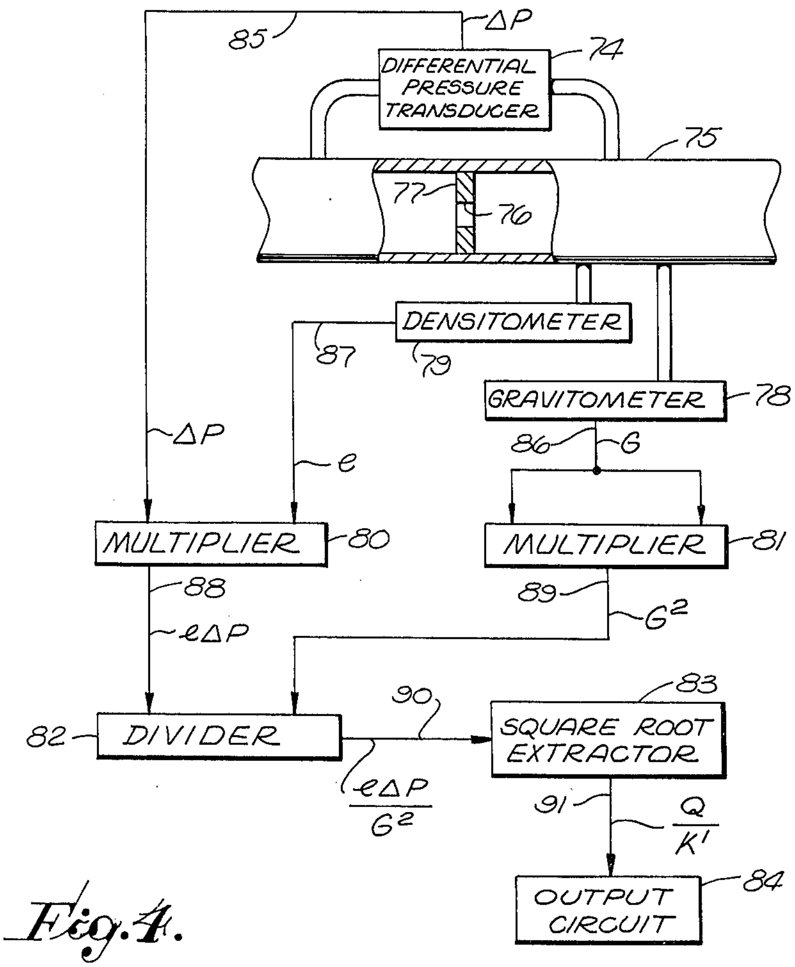
FIG. 4 is a diagrammatic view of a flowmeter constructed in accordance with an alternative embodiment of the present invention.

The embodiment of FIG. 4 mechanizes equation (24) for continuously indicating total volume flow $\int$ qdt. Rate of flow, Q, may be defined as follows:

$$Q = \frac{K' \sqrt{\rho \Delta P}}{G} \quad (24)$$

It will be recalled that equation (1) is as follows:

$$Q = K \sqrt{\frac{P \Delta P}{TG}} \quad (25)$$

Rewriting (14)

$$\frac{P}{T} = \frac{\rho}{K_{1a} G} \quad (26)$$

Substituting (26) in (25)

$$Q = K \sqrt{\frac{\rho \Delta P}{K_{1a} G^2}} \quad (27)$$

Hence, $$Q = \frac{K' \sqrt{\rho \Delta P}}{G} \quad (28)$$

where, $$K' = \frac{K}{\sqrt{K_{1a}}} \quad (29)$$

Note will be taken that equation (28) is the proof of equation (24).

In FIG. 4, a differential pressure transducer is indicated at 74 connected to a pipeline portion 75 on opposite sides of an orifice 76 in a disc 77 fixed in pipeline portion 75, as before. A gravitometer 78 is also connected from pipeline portion 75, as before. A densitometer 79 is also connected from pipeline portion 75.

Also shown in FIG. 4 is a multiplier 80, a multiplier 81, a divider 82, a square root extractor 83 and an output circuit 84. Parts 74, 75, 76, 77, 78, 83 and 84 may be identical to parts 33, 30, 32, 31, 50, 39 and 40, shown in FIG. 1, if desired. Densitometer 79, multipliers 80 and 81 and divider 82 may all be, by themselves, entirely conventional, if desired. However, the combination thereof with the other parts of FIG. 4 is new. Further, if desired, multipliers 80 and 81 and divider 82 may be identical to multipliers 36 and 37 and divider 38, respectively, shown in FIG. 1.

If desired, densitometer 79 may be identical to that disclosed in U.S. Pat. Nos. 3,677,067 and 3,769,831. The same is true of application Ser. No. 187,948 filed Oct. 12, 1971, by G. L. Schlatter and C. E. Miller for FLUID SENSING SYSTEMS assigned to the assignee of this application now U.S. Pat. No. 3,842,655 issued Oct. 22, 1974. The entire specification, claims and drawings of both of the aforementioned patents and the said copending application Ser. No. 187,948 are hereby incorporated by this reference hereto as though fully set forth herein hereat.

In FIG. 4, differential pressure transducer 74, gravitometer 78 and densitometer 79 have output leads 85, 86 and 87.

As before, differential pressure transducer 74 produces an output signal on lead 85 which is directly proportional to the difference between the pressures on opposite sides of the orifice 76.

Again, gravitometer 78 produces an output signal on lead 86 directly proportional to the gravity of the gas in pipeline portion 75. Densitometer 79 produces an output signal on lead 87 which is directly proportional to the density of the gas in pipeline portion 75. Multipliers 80 and 81 have output leads 88 and 89. Divider 82 has an output lead 90. Square root extractor 83 has an output lead 91.

Multiplier 80 is connected from differential pressure transducer 74 and densitometer 79 to divider 82. Multiplier 80 produces an output signal on lead 88 which is directly proportional to the product of the signals appearing on leads 85 and 87. Multiplier 81 produces an output signal on lead 89 which is directly proportional to the square of the output signal on lead 86.

Divider 82 is connected from the outputs of multipliers 80 and 81 to square root extractor 83. Divider 82 produces an output signal on lead 90 directly proportional to the output of multiplier 80 divided by the output of multiplier 81.

Square root extractor 83 produces an output signal on lead 91 directly proportional to the square root of the signal appearing on lead 90.

OPERATION OF THE ALTERNATIVE FLOWMETER OF FIG. 4

In the operation of the flowmeter of FIG. 4, differential pressure transducer 74 and densitometer 79 produce output signals directly proportional to the said differential pressure and gas density which are multiplied together by multiplier 80. The square of the output signal of gravitometer 78 is produced by multiplier 81, gravitometer 78 producing output signal directly proportional to the gravity of the gas in pipe portion 75. The output of multiplier 80 is divided by the output of multiplier 81 in divider 82. The square root of the output of divider 82 is taken by square root extractor 83.

As before, output circuit 84 produces an output which is directly proportional to the integral of the output signal on lead 91. Output circuit 84 thus indicates the total volume flow in standard cubic feet.

THE GRAVITOMETER OF FIG. 5

Figure 5:
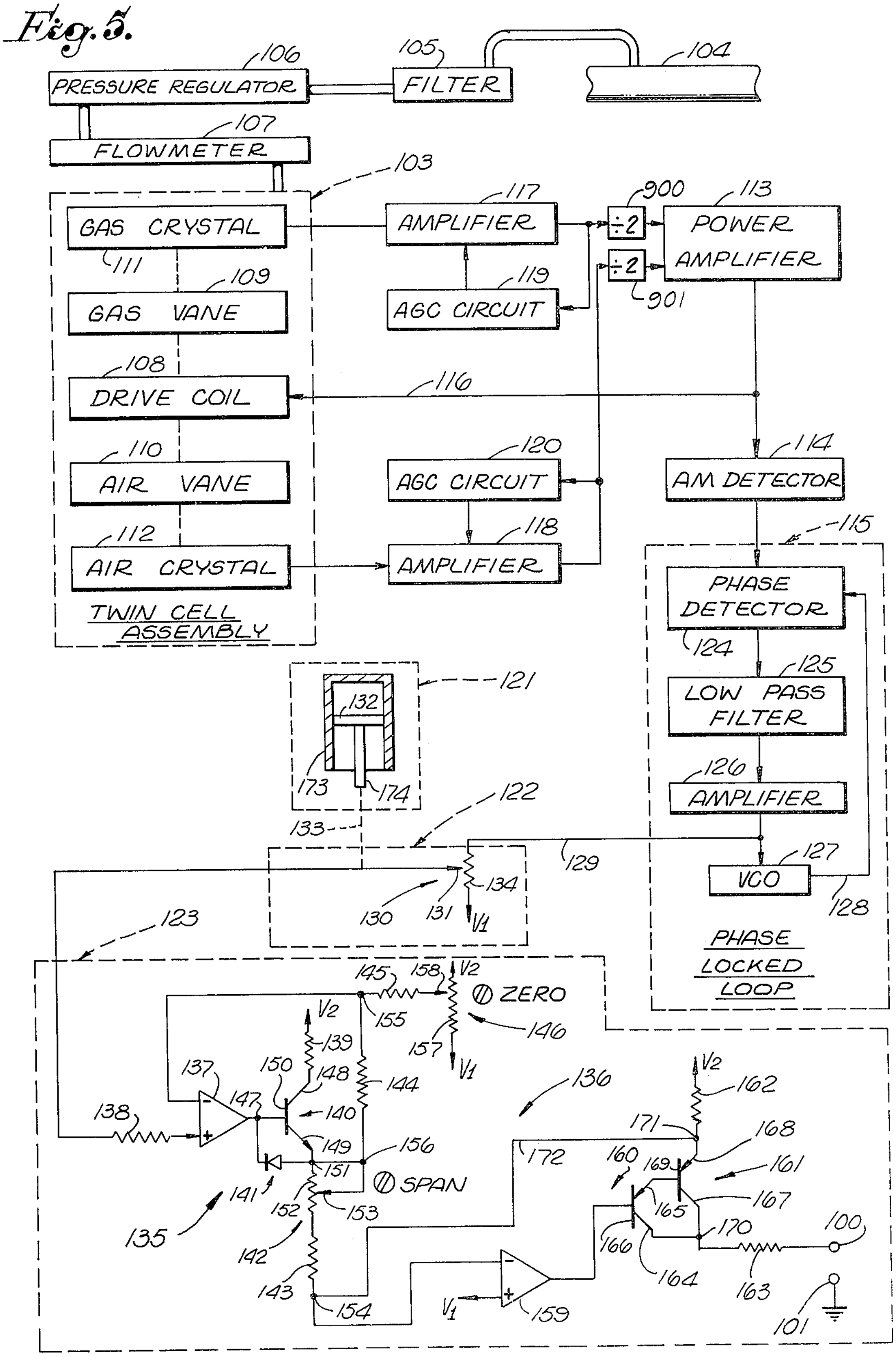
FIG. 5 is a diagrammatic view of a gravitometer.

A gravitometer such as that of FIG. 5 produces an output current, $I_o$, which is I=4 milliamperes at the low end of the span and 20 milliamperes at the high end in FIG. 5, these limits being conventional for an industrial instrument. However, zero adjustment could be made so that $$I_1 = K_{b1} G \quad (30)$$

However, $$\frac{dI}{dG} = \text{a constant } (S1) \quad (31)$$

even with the 4–20 mil span, where $K_{b1}$ is a constant.

Equation (31) is true for the following reasons.

If $$G = \frac{\rho_g}{\rho_a} \quad (32)$$

then $$G = 1 - \frac{\rho_a - \rho_g}{\rho_a} \quad (33)$$

It has been discovered in accordance with the present invention that an accurate measure of gas density, $\rho$, is $$\rho = At + B \quad (34)$$

where, $t = 1/f$, $f$ is the vane frequency,

A is a constant, and

B is a constant.

Equation (34) is an approximation of $$\rho = At^2 + B \quad (35)$$

For the development of equation (35), see the said U.S. Pat. No. 3,677,067.

From (34)

$$\rho_a = At_a + B \quad (36)$$

and $$\rho_g = At_g + B \quad (37)$$

where, $a$ represents air, and $g$ represents gas.

Subtracting (37) from (36)

$$\rho_a - \rho_g = A\,(t_a - t_g) \quad (38)$$

$$t_a - t_g = \frac{1}{f_a} - \frac{1}{f_g} \quad (39)$$

$$\frac{1}{f_a} - \frac{1}{f_g} = \frac{f_g - f_a}{f_g f_a} \quad (40)$$

In both of the embodiments of the present invention shown in FIGS. 5 and 18, the product $$\frac{1}{f_g} \times \frac{1}{f_a} \quad (41)$$

may be considered a constant because $f_g$ varies very little, e.g., from 315.0 Hz to 317.0 Hz or less for G = 0 to G = 1.0, and $f_a$ varies even less by percentage. Thus, the following approximation may be made $$\frac{1}{f_a} - \frac{1}{f_g} \cong C_1\,(f_g - f_a) \quad (42)$$

From (39) and (42)

$$t_a - t_g = C_1\,(f_g - f_a) \quad (43)$$

From (38) and (43)

$$\rho_a - \rho_g = C_1\,(f_g - f_a) \quad (44)$$

Defining $$\Delta f_1 = (f_g - f_a) \quad (45)$$

$$\rho_a - \rho_g = C_1 \Delta f_1 \quad (46)$$

From equation (9)

$$\rho_a = \frac{P_a}{R_a T_a} \quad (47)$$

where $K_{1a}$ = Ra, the gas constant of air.

Substituting (46) and (47) into (33)

$$G = 1 - \frac{C_1 \Delta f_1 R_a T_a}{P_a} \quad (48)$$

Substituting in (48)

$$D = C_1 R_a \quad (49)$$

and $$F = T_a/P_a \quad (50)$$

$$G = 1 - DF\Delta f_1 \quad (51)$$

In (51), D is a constant, and F and $\Delta f_1$ are variables. The embodiment of FIG. 5 develops a direct current voltage directly proportional to $\Delta f_1$, an analog of F and multiplies them together, then adds or subtracts a constant voltage, as desired, such that the output current, I, in milliamperes can be defined by $$I = SW\,(1 - DF\Delta f_1) + SX \quad (52)$$

where S, W and X are constants. Thus, from (51) and (52)

$$dI/dG = SW = \text{a constant.} \quad (53)$$

In (52) and (53), I is defined by I = Io, where I is the current in the special case of FIG. 5 and Io is current in the general case.

A gravitometer is shown in FIG. 5 having output terminals 100 and 101 which provide an output current directly proportional to gas gravity. Thus, terminals 100 and 101 may be connected to multiplier 36 in FIG. 1 or to multiplier 81 in FIG. 4. Still further, terminals 100 and 101 may be connected to any utilization means.

Thus, portions of FIGS. 1 and 4 may be considered to be, in the alternative, utilization means 102. Utilization means 102 may also be a milliammeter calibrated in gravity, if desired. Further, utilization means 102 may be a process controller or otherwise, whether or not described specifically or generally herein.

In FIG. 5, a twin cell assembly is indicated at 103. A pipeline portion is indicated at 104. A filter 105, a pressure regulator 106 and a flowmeter 107 are connected in series in that order from pipeline portion 104 to assembly 103.

Assembly 103 includes a drive coil 108, gas and air vanes 109 and 110, respectively, and gas and air crystals 111 and 112, respectively.

Also shown in FIG. 5 is a power amplifier 113, amplitude modulation (AM) detector 114 and a phase locked loop 115. The AM detector 114 and the loop 115 are connected in succession from the output of power amplifier 113. The output of power amplifier 113 is also connected to drive coil 108 over a lead 116. Drive coil 108 is sometimes called the driver coil or driver herein.

Amplifiers 117 and 118 are connected respectively from the outputs of crystals 111 and 112 to power amplifier 113 through respective divide-by-two dividers 900 and 901. Automatic gain control (AGC) circuits 119 and 120 are respectively connected from the outputs of amplifiers 117 and 118 to the gain control inputs thereof.

Also in FIG. 5, a T/P compensator 121, a multiplier 122 and an output circuit 123 are provided.

Loop 115 includes a phase detector 124, a low pass filter 125, an amplifier 126 and a voltage controlled oscillator (VCO) 127 connected in succession in that order from the output of AM detector 114. The output of VCO 127 is connected to a second input to phase detector 124 over a lead 128.

The output of amplifier 126 is also connected to multiplier 122 over a lead 129.

Multiplier 122 is simply a potentiometer 130 having a wiper 131 that is moved in synchronism with a piston 132 in compensator 121 by a mechanical connection 133 therebetween. Potentiometer 130 also includes a winding 134. The upper end of winding 134, as viewed in FIG. 5, is connected from the output of amplifier 126. The lower end of winding 134 is connected to potential V1.

As will be noted from the following, potentials V1 and V2 are used. As a matter of convenience for operation in commercial applications, V1 may be equal to +10 volts and V2 may be equal to +20 volts. However, for a better understanding of this invention, and for an alternative construction, the symbol for ground herein may be considered to be −10 volts. In that case, the potentials V1 and V2 would be 0 volts and +10 volts, respectively.

Output circuit 123 in FIG. 5 includes a calibration circuit 135 and a voltage-to-current converter 136. Circuit 135 includes a differential amplifier 137, a resistor 138, a resistor 139, a transistor 140, a diode 141, a potentiometer 142, a resistor 143, a resistor 144, a resistor 145 and a potentiometer 146.

Resistor 138 is connected from the output of multiplier 122 to the noninverting input of amplifier 137. The output of amplifier 137 is connected to a junction 147. Transistor 140 includes a collector 148, an emitter 149 and a base 150. Base 150 is connected to junction 147. Emitter 149 is connected to a junction 151. Diode 141 is connected between junctions 147 and 151, and poled to be conductive in a direction toward junction 147. Resistor 139 is connected from collector 148 to potential V2. Potentiometer 142 includes a winding 152 and a wiper 153. Potentiometer winding 152 and resistor 143 are connected in succession in that order from junction 151 to an output junction 154.

The inverting input of amplifier 137 is connected from a junction 155. Resistor 144 is connected from junction 155 to a junction 156. Junction 156 is connected both to junction 151 and to potentiometer wiper 153.

Potentiometer 146 includes a winding 157 and a wiper 158. Resistor 145 is connected from junction 155 to potentiometer wiper 158. The upper end of potentiometer winding 157 is connected to potential V2. The lower end of potentiometer winding 157 is connected to potential V1.

If desired, a conventional screwdriver adjustment may be provided for potentiometer wiper 158 to provide a zero adjustment.

If desired, a conventional screwdriver adjustment may be provided for potentiometer 142 for the adjustment of span. Note will be taken that, in effect, the constant voltage appearing at potentiometer wiper 158 is added, with opposite sign, to the input to circuit 123 for multiplier 122 because the connections from resistors 145 and 138 to amplifier 137 are to the inverting and non-inverting inputs thereof, respectively.

The position of potentiometer wiper 153 adjusts span because it adjusts feedback to the inverting input via resistor 144.

Any conventional output circuit may be employed in lieu of output circuit 123. The same is true of converter 136. Converter 136 includes a differential amplifier 159 which has a non-inverting input maintained at potential V1. Converter 136 also includes transistors 160 and 161, and resistors 162 and 163. Transistor 160 includes a collector 164, an emitter 165 and a base 166. Transistor 161 includes a collector 167, an emitter 168 and a base 169.

The output of amplifier 159 is connected to the transistor base 166. Emitter 165 is connected to base 169. Collectors 164 and 167 are connected together at a junction 170. Emitter 168 is connected to a junction 171. Resistor 163 is connected between junction 170 and terminal 100. Resistor 162 is connected from junction 171 to potential V2. A lead 172 joins junctions 154 and 171. The inverting input to amplifier 159 is connected from junction 154.

Compensator 121 may be entirely conventional. Compensator 121 includes a cylinder 173 inside of which piston 132 moves. Piston 132 is thus sealed in an air tight manner to the internal cylindrical wall of cylinder 173. A piston rod 174 is fixed to piston 132 and moves wiper 131 of multiplier 122 in synchronism therewith.

From the formula $PV = MRT$, it will be appreciated that when M and R are constants, the volume defined by cylinder 173 and piston 132 will be directly proportional to the ratio of T:P. Hence, rod 174 always moves a distance which is directly proportional to T/P.

In FIG. 5, filter 105, pressure regulator 106 and flowmeter 107 may be entirely conventional. Preferably, a filter 105 is a 2 micron filter. It may be made of a sintered metal having gaps between particles bound together to permit fluid flow therethrough while trapping particles equal to or larger than 2 microns in their maximum cross-sectional dimension.

If desired, amplifiers 117 and 118 and AGC circuits 119 and 120 may be conventional, although their connection is new.

AM detector 114 and phase locked loop 115 both may be entirely conventional, if desired.

As is conventional, the phase of the input signal to phase detector 124 from AM detector 114 is compared with the phase of the output signal of VCO 127 by phase detector 124. The output of phase detector 124 then passes through filter 125 and is amplified by amplifier 126. Amplifier 126 then produces a D.C. output voltage which is impressed upon VCO 127. The frequency and thus the phase of the output signal of VCO 127 is controlled in accordance with the magnitude of the input voltage impressed thereon by amplifier 126.

The signal on output lead 129 from loop 115 is then a D.C. voltage, the magnitude of which is directly proportional to the fundamental frequency of the output waveform of AM detector 114. Loop 115 is thus a device for producing a frequency analog in the form of a D.C. voltage.

Pressure regulator 106 is employed to pass a portion of the gas in pipeline 104 through assembly 103 at a very low constant pressure and a very low volume flow rate. The gas is passed through a chamber in assembly 103, to be described. The pressure in this chamber is then substantially equal to atmospheric pressure because the chamber is vented to the atmosphere and because the gas is circulated at a very slow rate.

Filter 105 keeps the gravitometer clean. Flowmeter 107 can be employed to fix rate of gas flow so that regulator 106 may be adjusted, if desired, for calibration.

Figure 6:
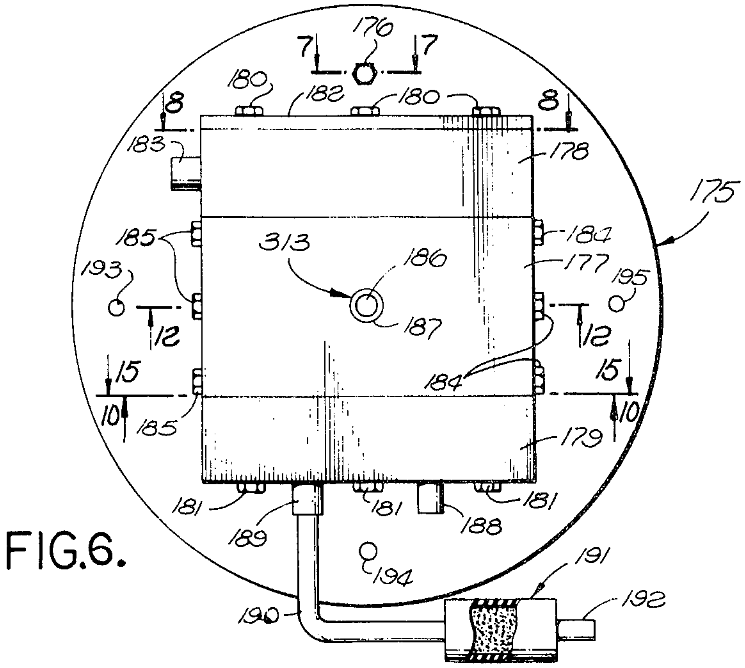
FIG. 6 is a top plan view of a twin cell assembly indicated diagrammatically in FIG. 5.

A top plan view of assembly 103 is shown in FIG. 6 including a supporting plate 175, a supporting bolt 176, a central block 177, an inlet block 178 and an outlet block 179. Inlet block 178 is fixed to central block 177 by six cap screws 180, only three of which are shown in FIG. 6. Similarly, outlet block 179 is fixed to central block 177 by six cap screws 181. A cover plate 182 is positioned between the heads of screws 180 and inlet block 178. Inlet block 178 has an inlet ferrule 183 into which a conduit may be inserted and sealed from flowmeter 107.

Four cap screws 184 fix a subassembly to block 177. Similarly, four cap screws 185 fix another subassembly to block 177. Both of the said subassemblies will be described hereinafter.

As will be described, a ferromagnetic rod 186 projects into and is fixed relative to block 177. A driver coil 187 is fixed relative to rod 186 therearound.

Outlet block 179 carries gas and air vent ferrules 188 and 189, respectively, fixed relative thereto. A conduit 190 is inserted into ferrule 189 and may be sealed therein, if desired. A dessicator 191 is connected from conduit 190 and has a vent tube 192 allowing air to pass back and forth through dessicator 191 from the atmosphere into and out of block 177 through dessicator 191 from and to the atmosphere, respectively.

Only one bolt 176 is shown in FIG. 6. However, four bolts are preferably employed. Other bolts would pass through holes 193, 194 and 195 in plate 175, as shown in FIG. 6.

Figure 7:
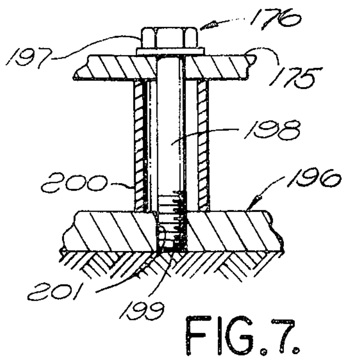
FIG. 7 is a vertical sectional view taken on the line 7—7 through a mounting bolt shown in FIG. 6.

All the structures shown in FIG. 7 are fixed relative to each other. A plate 196 is provided below plate 175. Bolt 176 has a head 197 that rests on top of plate 175, a shank 198 which is slidable therethrough and a threaded lower end 199 which is threaded into plate 196. A cylindrical spacer 200 is held in axial compression between plates 175 and 196, bolt shank 198 extending through the center of spacer 200.

Plate 196 has four threaded holes 201, only one of which is shown in FIG. 7. The other three holes lie substantially in registration with holes 193, 194 and 195, respectively, of plate 175.

Figure 8:
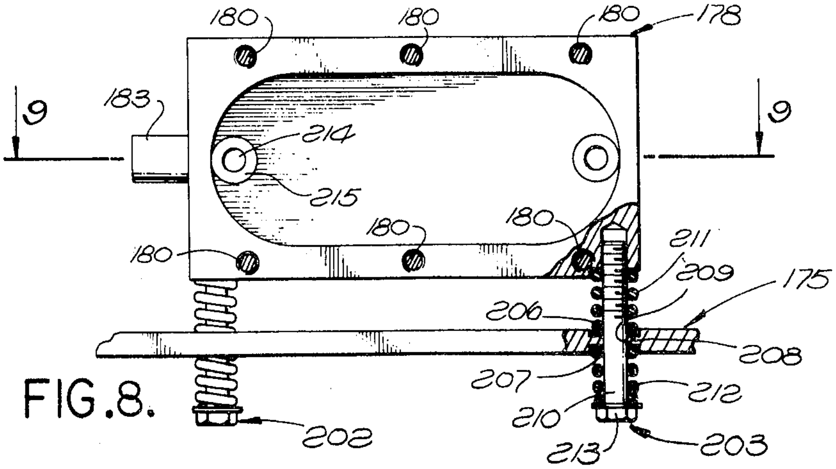
FIG. 8 is a vertical sectional view taken on the line 8—8 shown in FIG. 6.

As shown in FIG. 8, block 178 has two cap screws 202 and 203 fixed relative thereto. The structure immediately surrounding screw 202 is substantially identical to that surrounding screw 203. Thus, the structure immediately surrounding screw 203 will be the only structure described. The same is true of the structure surrounding screws 204 and 205 in FIG. 15. Plate 175 is recessed at 206 and 207. Plate 175 has a web 208 which separates the recesses 206 and 207. Web 208, itself, has an opening 209 therethrough through which the shank 210 of screw 203 projects. Screw shank 210 is thus slidable through opening 209. A spring 211 is trapped and held in compression between web 208 and the lower end of block 178, as viewed in FIG. 8. A spring 212 is trapped and held in compression between web 208 and the head 213 of screw 203. A resilient mounting is thus provided for all the structure above plate 175 which is fixed relative to screws 202, 203, 204 and 205.

Screws 180, shown in FIGS. 6 and 8, are slidable through corresponding holes in plate 182 and block 178 and threaded part way into block 177.

Figure 9:
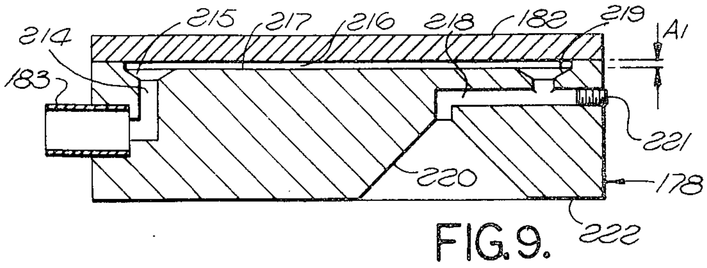
FIG. 9 is a horizontal sectional view taken on the line 9—9 shown in FIG. 8.

As shown in FIG. 9, gas can be introduced into block 178 through a conduit 214 through a frusto-conical port 215 into a thin space 216. A number of the relative dimensions shown herein may be employed, if desired. Space 216 is defined by a recess 217 in block 178 shown in FIG. 9. Gas can then enter a condiut 218, shown in FIG. 9, through another frustoconical port 219. A larger frusto-conical outlet surface 220 then lies in communication with conduit 218. One end of conduit 218 is closed by a screw 221 threaded therethrough and sealed therein.

As shown in FIG. 9, the depth of recess 217 is quite small and is represented by the dimension A1. It is thus possible to equalize the temperatures of the gas and air in block 177, to be described. Preferably, blocks 177, 178 and 179 are made of 302 stainless steel or are made of 303 stainless steel. Blocks 177, 178 and 179 may be made of these or any other conventional materials which have a fairly good thermal conductivity and are nonmagnetic. However, it makes little difference whether or not any of the cap screws shown in FIGS. 6, 7, 8 and 15 are or are not magnetic. They may or may not be magnetic, as desired.

Figure 10:
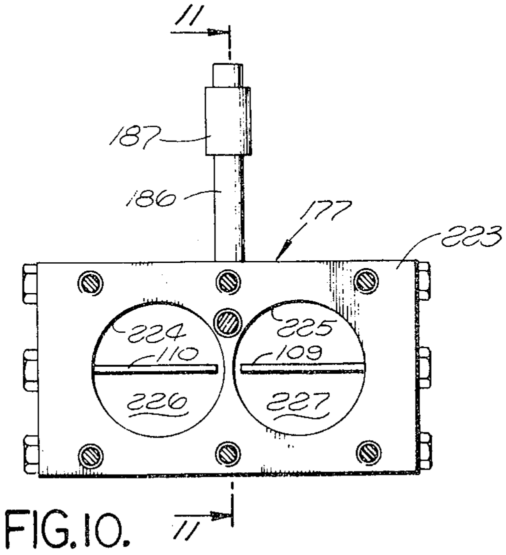
FIG. 10 is a vertical sectional view taken on the line 10-10 shown in FIG. 6.

The lower face 222 of block 178, shown in FIG. 9, fits on the face opposite 223 of block 177, shown in FIG. 10, with the cylindrical surface 225, shown in FIG. 10, having an axis that is the same as that of conical surface 220, shown in FIG. 9. The width and heights of blocks 177, 178 and 179 are all the same. They also are aligned as in FIG. 6.

As shown in FIG. 10, another cylindrical surface is provided at 224. Cylindrical holes 224 and 225 extend completely through the width of block 177, spaces inside thereof being mostly defined by the surfaces 224 and 225. These spaces may be hereinafter referred to as the gas chamber 227 and the air chamber 226. Note that surface 222 in FIG. 9 closes one end of air chamber 226.

Air vane 110 extends into air chamber 226. Gas vane 109 projects into gas chamber 227.

Figure 11:
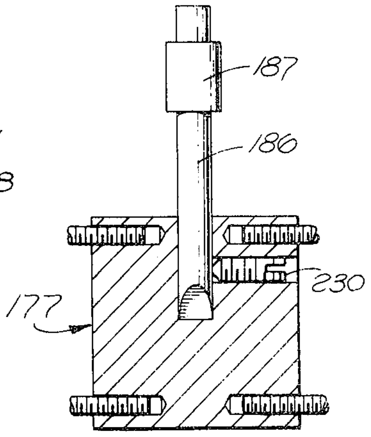
FIG. 11 is a vertical sectional view taken on the line 11-11 shown in FIG. 10.
Figure 12:
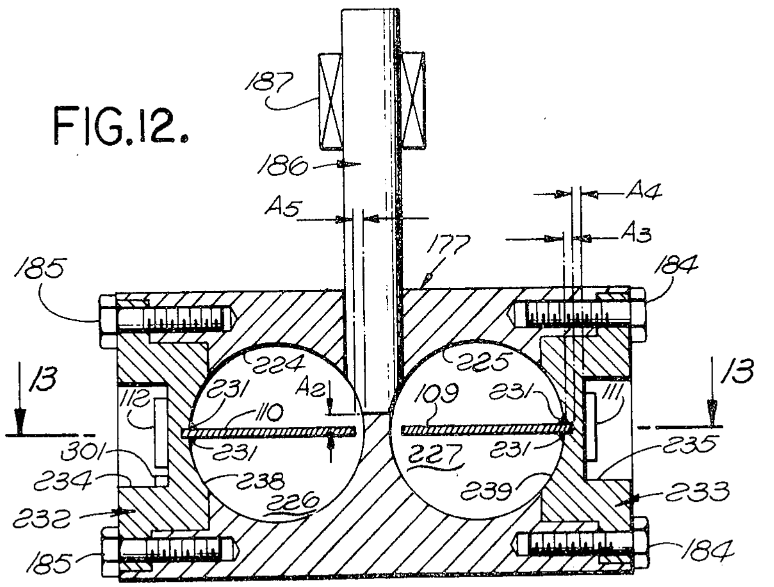
FIG. 12 is a vertical sectional view taken on the line 12-12 shown in FIG. 6.

As shown in FIG. 11, rod 186 is fixed in block 177 by a set screw 230. Rod 186 and set screw 230 may also be sealed therein, if desired. As shown in FIG. 12, vanes 109 and 110 are silver soldered at 231 to respective circular inserts 233 and 232 fixed relative to block 177 by screws 184 and 185, respectively.

Inserts 232 and 233 have respective recesses 234 and 235 at the bottom of which piezoelectric crystals 112 and 111 and bonded with any conventional agent such as a conventional epoxy.

In FIG. 12, note will be taken that the lower end of rod 186 is disposed slightly above the upper surface of vane 110, as viewed in FIG. 12.

Figure 13:
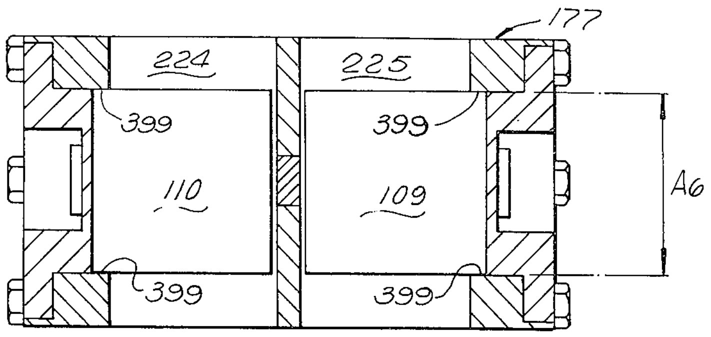
FIG. 13 is a horizontal sectional view taken on the line 13-13 shown in FIG. 12.

If desired, vanes 109 and 110 may be identical. Moreover, the upper and lower surfaces thereof may lie in two corresponding single planes. Certain symmetry will be evident from FIGS. 12 and 13.

The location of the lower end of rod 186 above the vanes is indicated at A2 in FIG. 12.

As shown in FIG. 12, inserts 232 and 233 have cylindrical portions 238 and 239, respectively, which mate with the cylindrical surfaces 224 and 225, respectively.

Note will be taken that each vane is set the same distance in a corresponding insert in a notch therein which has a depth A3, shown in FIG. 12. The nearest vane edges are thus spaced distances from the crystals equal to A4, shown in FIG. 12.

Figure 14:
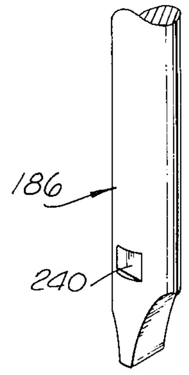
FIG. 14 is a perspective view of a ferromagnetic rod shown in FIGS. 6, 10, 11 and 12.

As shown in FIG. 14, rod 186 may have a flat 240 for set screw 230.

Figure 16:
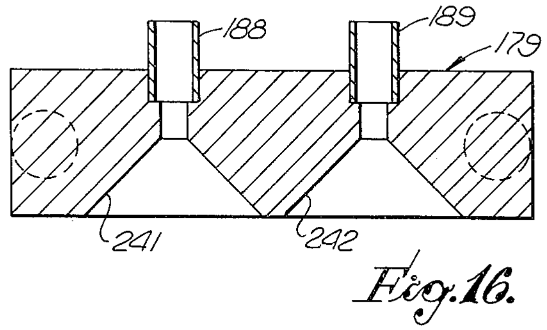
FIG. 16 is a horizontal sectional view taken on the line 16-16 shown in FIG. 15.
Figure 15:
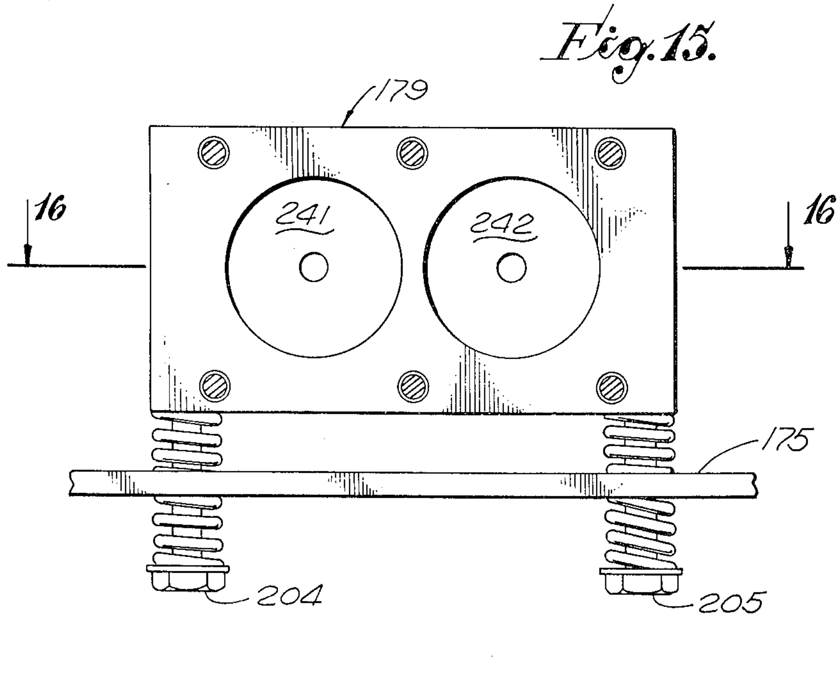
FIG. 15 is a vertical sectional view taken on the line 15-15 shown in FIG. 6.

As shown in FIGS. 15 and 16, block 179 has frusto-conical surfaces 241 and 242 defining spaces from which air and gas are vented to the atmosphere respectively through ferrules 189 and 188, respectively.

In FIG. 17, assembly 103 is again illustrated with amplifiers 117 and 118, AGC circuits 119 and 120, power amplifier 113 and AM detector 114.

Amplifiers 117 and 118 are identical. For this reason, only one of these amplifiers will be described in detail. The same is true of AGC circuits 119 and 120.

Amplifier 117 includes a differential amplifier 243 having a noninverting input lead 244, an inverting input lead 245 and an output connected to a junction 246.

One side of gas crystal 111 is connected to potential V1. Lead 245 is connected to a junction 247. The other side of gas crystal 111 is connected to junction 247 by a capacitor 248 and a resistor 249 connected in succession in that order therefrom. Potential V1 is connected to junction 250. A resistor 251 is connected between junctions 247 and 250.

Junctions are provided at 252 and 253. A lead 254 connects junctions 246 and 252. A resistor 255 connects junctions 252 and 253. A resistor 256 is connected from junction 253 to lead 244.

In AGC circuit 119, a diode 257, a resistor 258 and a resistor 259 are connected in succession in that order from junction 252 to a junction 260 which is maintained at potential V1. Diode 257 is poled to be conductive in a direction away from junction 252. Junctions are also provided at 261, 262, 263 and 264. AGC circuit 119 also includes a differential amplifier 265 having non-inverting and inverting input leads 266 and 267, respectively.

Junction 261 connects lead 266 to the lower end of resistor 258 and to the upper end of resistor 259. A diode 268 is connected between junctions 260 and 262, and poled to be conductive in a direction toward junction 260. A resistor 269 is connected from junction 262 to potential V2. A capacitor 270 is connected between junctions 263 and 264. A lead 271 connects junctions 261 and 263, lead 267 being connected to junction 263.

AGC circuit 119 also includes a field effect transistor 272 including a source 273, a drain 274 and a gate 275. A resistor 276 is connected between junction 264 and gate 275. Source 273 is connected to potential V1. Drain 274 is connected to junction 253 in amplifier 117 via a capacitor 277.

Power amplifier 113 includes a differential amplifier 278 having a non-inverting input lead 279, and an inverting input lead 278. Lead 279 is connected to a junction 280 which is maintained at potential V1. Lead 278 is connected to a summing junction 281. Another junction is provided at 282. Summing resistors 283, 284, 285 and 286 are respectively connected from amplifier 118, potentiometer wiper 287, junction 246 and coil 108 to summing junction 181. Wiper 287 is the wiper of a potentiometer 288 that has a winding 289. The lower end of winding 289 is connected to ground. The upper end of winding 289 is connected to potential V1.

A current pickoff resistor 290 is connected between a junction 291 and junction 280. Junction 291 is connected from one side of coil 108 and from one side of resistor 286. A resistor 292 and a capacitor 293 are connected in succession in that order from a junction 294 to a junction 295. The right end of resistor 286 is connected to junction 294. A lead 296 is connected between junctions 281 and 294.

Power amplifier 113 also includes transistors 298 and 299. Transistor 298 has a collector 300, an emitter 301 and a base 302. Transistor 299 has a collector 303, an emitter 304 and a base 305. A resistor 306 is connected from the output of amplifier 278 to the transistor bases 302 and 305. The transistor emitters 301 and 304 are connected to an output junction 307. A resistor 308 is connected from collector 300 to potential V2. A resistor 309 is connected from collector 303 to ground. Junctions 307 and 295 are connected together by a lead 310. Coil 108 is connected between junctions 291 and 295. AM detector 114 is also connected from junction 307.

Power amplifier 113 performs several functions. However, in general, it acts as a conventional analog adder to add unconventional signals together and apply them to coil 108 and AM detector 114.

The output voltage at junction 307 is a sine wave modulated sine wave. Its average value is zero (V1 is assumed to be 0 volts; ground, −10 volts and V2, +10 volts).

Not only is the voltage at junction 307 a sine wave, this sine wave is also amplitude modulated by a sine wave.

There is no D.C. shift of the modulated carrier. The D.C. shift is zero and is kept zero by feedback. This feedback is achieved by the use of resistor 290. The voltage drop across resistor 290 is essentially directly proportional to the current in coil 108. The voltage drop across resistor 290 is added at summing junction 281 through resistor 286 and lead 296 and cancelled out by the setting of potentiometer wiper 287 and/or automatically.

The voltage drop across resistor 290 establishes a zero D.C. current component in both the voltage across and the current through coil 108. The voltage appearing at wiper 287 is subtracted at summing junction 281 through resistor 284, the voltage across resistor 290 being subtracted therefrom by the connection of resistor 286 from junction 291 to summing junction 281.

The outputs of amplifiers 117 and 118 are added together at summing junction 281 through resistors 285 and 283, respectively.

An A.C. voltage feedback to establish a constant A.C. envelope component of voltage across coil 108 is achieved through the feedback from output junction 307 through lead 310, junction 295, capacitor 293, resistor 292, junction 294, lead 296 to summing junction 281.

As stated previously, power amplifier 113 acts as an analog adder-subtractor which has three inputs that are added to two feedback inputs. The outputs of amplifiers 117 and 118 are essentially sine waves. Thus, a better understanding of the power amplifier 113 may be obtained by reviewing what happens when two sine wave are added together.

The equation for the voltage $e$ at the output of the power amplifier 113 (54 ) in FIG. 5 involves the familiar trigonometric identity $$\sin x + \sin \mu = 2 \sin \frac{(x+\mu)}{2} \cos \frac{(x+\mu)}{2} \qquad (55)$$

Thus, e may be defined $$e = E_1 + 2E_2 \sin \frac{(x+\mu)}{2} \cos \frac{(x+\mu)}{2} \qquad (55)$$

where, (57)

$2E_2$ is the peak amplitude of the carrier, $$x = \frac{N\omega w t}{2}$$

$$\mu = \frac{N\omega v t}{2}$$

where, $\omega = 6.28$,
$t$ is time,
$N = ½$
$w$ is the frequency of the output signal of the gas crystal, for example and
$v$ is the frequency of the output signal of the air crystal, for example.

From the foregoing, it will be appreciated that $w$ can equal $f_g$, and that $v$ can equal $f_a$.

The zero magnitude of the voltage value is determined by the resistance of resistor 290 and the setting of potentiometer 288. The magnitude of $E_2$ may be less than, equal to or greater than 12.5 volts.

The current, i, in coil 108 may be similarly expressed $$i = 2I_2 \sin \left[ \frac{(x+\mu)}{2} + \phi_1 \right] \cos \left[ \frac{(x-\mu)}{2} + \phi_2 \right]$$

where $I_1$, $I_2$, $\phi_1$ and $\phi_2$ are constants.

Coil 108 acts as an inductor. The terms $\phi_1$ and $\phi_2$, therefore, represent any A.C. current component lag which may be present due to the inductive reactance of coil 108.

The fundamental of the output of the power amplifier 113 is, therefore, directly proportional to $e_f$, where $$e_f = 2E_2 \sin \frac{(x+\mu)}{2} \cos \frac{(x+\mu)}{2}$$

Figure 17:
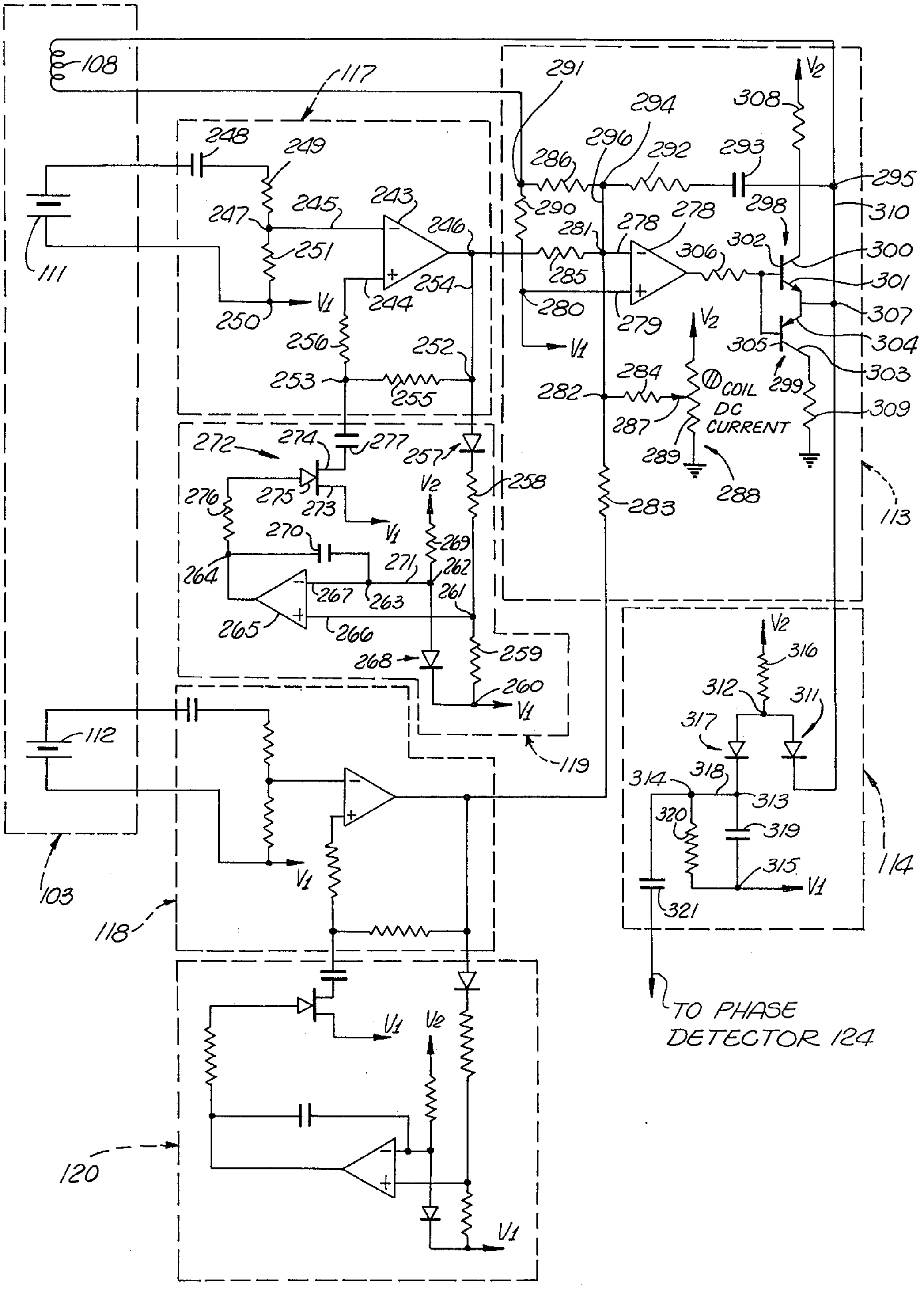
FIG. 17 is a schematic diagram of a portion of the circuit shown in FIG. 5*i*

In FIG. 17, AM detector 114 includes a diode 311 connected from junction 307 in power amplifier 113 to a junction 312. Junctions are provided at other points in the AM detector 114 at 313, 314 and 315. A resistor 316 is connected from junction 312 to potential V2. Diode 311 is poled in a direction away from junction 312. A diode 317 is connected between junctions 312 and 313, and poled in a direction toward junction 313. Junctions 313 and 314 are connected together by a lead 318. A capacitor 319 is connected between junctions 313 and 315. A capacitor 321 is connected from junction 314 to phase detector 124 in FIG. 5.

Capacitor 319, resistor 320, and capacitor 321 form a filter to attentuate the harmonics of the fundamental appearing at the input of AM detector 114.

The output of the AM detector 114 is then a full wave rectified sine wave of a signal having a frequency equal to one-half the difference between the frequencies at which the vanes 109 and 110 vibrate.

It is by no means a limitation on this invention, but, for example, vanes 109 and 110 may vibrate at frequencies of 315 or 316 Hz. The complete range of G in this case may be indicated from, for example, 0 to 1.0 with a mean frequency difference of 1.0 to 2.0 Hz. A typical means frequency difference for G = 1.0 may, for example, be 1.77 Hz.

From the foregoing, it will be appreciated that a voltage directly proportional to the term $DF\Delta f$ in equation (52) is impressed upon the input of the output circuit of FIG. 5 because the product of the variable F from the T/P compensator and the $\Delta f_1$ D.C. analog voltage at the output of the amplifier in the phase locked loop is obtained by the multiplier. I of (52) is then derived by an appropriate zero and span adjustments in the output circuit which establishes S, W and X.

If the multiplier output voltage $e_{m1}$ is defined as $$e_{m1} = WDF\Delta f_1 \quad (58)$$

The zero adjust can subtract Z thus $$WDF\Delta f_1 - Z \quad (59)$$

where, $Z = W + X$, and
$W$ and $X$ are both constants.

Thus, $$WDF\Delta f_1 - (W + X) \text{ and} \quad (60)$$
$$-W(1 - DF\Delta f_1) - X \quad (61)$$

With the span adjustment, (57) can be multiplied by −S thus $$I = SW(1 - DF\Delta f_1) + SX \quad (62)$$

The span adjust thus controls S, and the zero adjust controls Z, where $Z = W + X$.

OPERATION OF THE GRAVITOMETER OF FIG. 5

In the operation of the gravitometer of FIG. 5, filter 105 keeps the gas from pipeline portion 104 free of small particles. Pressure regulator 106 reduces the gas pressure and keeps it constant. This gas then flows at a slow rate through flowmeter 107 into block 178 and into the space 216. The temperature between the air in chamber 226 and the gas in chamber 227 is then equalized, all of the blocks 177, 178 and 179 being thermally conductive. Air chamber 227 is kept open to the atmosphere through dessicator 191 and vent tube 192. The interior of the gas chamber 227 is continuously purged at a very low rate and the gas therein is exhausted through ferrule 188, shown in FIG. 6. Gas and air crystals 111 and 112 in FIG. 5 are then vibrated by impressing a zero level shifted sine wave modulated sine wave carrier on drive coil 108. Although unexpected, this single drive coil 108 vibrates the gas and air vanes 109 and 110, respectively, at respective different frequencies. These different frequencies are picked up by gas and air crystals 111 and 112, respectively. The amplified outputs of the crystals 111 and 112 then are impressed upon power amplifier 113 by amplifiers 117 and 118, respectively, through dividers 900 and 901, respectively. AGC circuits 119 and 120 keep the peak amplitudes of the output signals of amplifiers 117 and 118, respectively, constant and equal to each other.

Due to the fact that ferromagnetic rod 186 will attract ferromagnetic vanes 109 and 110 in the same direction regardless of the direction of flow of the current in driver coil 187, the frequencies of the outputs of amplifiers 117 and 118 will be substantially double the vane vibrational frequencies. This is taken care of by dividers 900 and 901.

Power amplifier 113 adds the outputs of dividers 900 and 901 together with current and voltage feedback signals. The output of power amplifier 113 is then impressed upon drive coil 108 and AM detector 114. The output signal of power amplifier 113 is the said zero level shifted sine wave modulated carrier. AM detector 114 can operate as an entirely conventional AM detector. It may, in fact, be a conventional AM detector. Thus, the output of AM detector 114 produces an output signal which is impressed upon phase detector 124 in phase locked loop 115. The output signal of AM detector 114 then is a full wave rectified signal at one-half the mean difference of the vane frequencies. That is, the full wave sine wave rectified output signal of AM detector 114 is the same as a full wave rectified sine wave at one-half the mean difference frequency. The mean difference frequency is hereby defined for use herein as one-half the difference between the frequencies of vibration of the vanes 109 and 110.

Phase locked loop 115 then produces an output voltage which is impressed upon multiplier 122. The output voltage of loop 115 is taken from the output of amplifier 126 and is directly proportional to one-half the said mean difference frequency.

The voltage appearing at wiper 131 of potentiometer 130 in multiplier 122 is then a product of two inputs. One of these is the output voltage of loop 115 on lead 129. The other input is proportional to T/P and is determined by the location of movable piston 132 in fixed cylinder 173. This determines the other input because it determines the location of potentiometer wiper 131 on winding 134 by the connection 133 thereto.

The input impressed upon output circuit 123 through resistor 138 from multiplier 122 is then a D.C. voltage which is directly proportional to the product of the ratio T/P and the said mean difference frequency.

Output circuit 123 then can be employed to, through the same or any different conventional voltage-to-current converter 136, produce an output current directly proportional to G, as explained previously. The position of wiper 158 of potentiometer 146 in output circuit 123 determines what level shift is required to make the current at output terminal 100 directly proportional to G. The position of wiper 153 on potemtiometer 142 determines what the range of current will be for a particular range of G. Note will be taken that amplifier 137 in output circuit 123 again acts more or less as a simple analog adder. However, since the input signal is connected to the noninverting input of amplifier 137, the zero adjust voltage at the potentiometer wiper 158 is thus effectively subtracted from the input signal. See the minus sign in front of Z in equation (59).

For span, the output feedback voltage at junction 156 is added to the voltage appearing at potentiometer wiper 158 at summing junction 155, which junction is connected to the inverting input of amplifier 137.

The present invention is adaptable for use with either analog or digital function generators.

What is claimed is:

1. A gravitometer comprising: a body having first and second chambers therein to contain air and a gas of interest, respectively; first and second spring metal ferromagnetic cantilevered vanes mounted in said first and second chambers, respectively, each vane having one end fixed relative to said body and a free end opposite thereof for immersion in said air and gas, respectively, said first vane free end being positioned to vibrate back and forth in a first pair of predetermined opposite directions in said first chamber without touching said body, said second vane free end being positioned to vibrate back and forth in a second pair of predetermined opposite directions in said second chamber without touching said body, said first pair of directions being approximately parallel to the direction in which the thicknesses of both of said first and second vanes are measured, said second pair of directions being approximately parallel to the direction in which the second vane thickness is measured; driver coil means fixed relative to said body in a position to attract said vane free ends when said coil is energized; first and second pickups fixed relative to and contiguous to the said one end of said first and second vanes, respectively, to produce respective output signals of the respective vane frequencies; and amplifier means connected from both of said pickups to said drive coil means to impress an output signal on said driver coil means to cause the current therein to flow alternately in opposite directions and to cause said first and second vanes to vibrate continuously at respective frequencies equal to one-half the frequencies of the output signals of said first and second pickups, respectively, said amplifier means including first and second means connected from said first and second pickups, respectively, to produce first and second signals of first and second frequencies, respectively, equal to one-half the frequencies of the output signals of said first and second pickups, respectively, and third means connected from said first and second means to produce a sum signal directly proportional to the sum of said first and second signals, said amplifier means being connected to said driver coil means to impress said sum signal thereon.

2. The invention as defined in claim 1, wherein said first means includes a divide-by-two divider, said second means also including a divide-by-two divider.

3. The invention as defined in claim 2, wherein computer means are provided which are connected from both of said pickups to produce an output signal responsive to the outputs of said pickups which is directly proportional to $I_o$, where $dI_o/dG$ equals a constant and $G = \rho_g/\rho_a$, where $\rho_g$ is the density of said gas, and $\rho_a$ is the density of said air; and utilization means connected from said computer means to receive said output signal thereof.

4. The invention as defined in claim 3, wherein said sum signal has an amplitude directly proportional to $\rho_f$, where $$\rho_f = 2E_2 \sin \frac{(x+\mu)}{2} \cos \frac{(x-\mu)}{2}$$

where $2E_2$ is the peak amplitude of the carrier, $X = N\omega wt/2$, $\mu = N\omega vt/2$,
where $\omega = 6.28$, $t$ is time, $N = ½$, $w$ is the frequency of the output signal of the gas crystal, for example, and v is the frequency of the output signal of the air crystal, for example.

5. A gravitometer comprising: a base; first and second ferromagnetic structures mounted on said base in a position to be vibrated independently of each other; a housing having first and second chambers to confine two different fluids around said first and second structures, respectively, said housing being mounted on said base; first and second pick-offs fixed relative to and contiguous to said first and second structures, respectively, to produce first and second output signals of first and second respective frequencies equal to the respective resonant frequencies of said first and second structures, respectively; a ferromagnetic driver mounted on said base in a position such that, when energized, it can cause said first and second structures to vibrate in or out of synchronism; at least first and second means connected in succession in that order from said first pickup to said driver; at least third and fourth means connected in succession in that order from said second pickup to said driver, said driver being constructed to produce a magnetic field in one direction and then alternately in the opposite direction, at least one of said first and second means including an amplifier, at least one of said third and fourth means including an amplifier, said first and second structures, said first and second pickups, said first, second, third and fourth means and said driver forming two combined closed loop electromechanical oscillators, said amplifiers having respective gains adequate to sustain vibrations of both of said first and second structures continuously, one of said first and second means including a divide-by-two divider, one of said third and fourth means also including a divide-by-two divider; and utilization means connected from the outputs of both of said first and third means.

* * * * *